United States Patent [19]

Jones et al.

[11] Patent Number: 6,145,592
[45] Date of Patent: Nov. 14, 2000

[54] GELLING POLYMERS FOR WELLBORE SERVICE FLUIDS

[75] Inventors: Timothy Gareth J. Jones, Cottenham; Gary J. Tustin, Cambridge, both of United Kingdom

[73] Assignee: Schlumberger Technology Corporation, Sugar Land, Tex.

[21] Appl. No.: 09/210,038

[22] Filed: Dec. 11, 1998

[30] Foreign Application Priority Data

Dec. 13, 1997 [GB] United Kingdom ............. 9726332

[51] Int. Cl.⁷ .................................... E21B 33/13
[52] U.S. Cl. .................. 166/294; 166/270; 166/305.1
[58] Field of Search ................... 166/270, 294, 166/300, 305.1

[56] References Cited

U.S. PATENT DOCUMENTS

| | | | |
|---|---|---|---|
| 3,826,311 | 7/1974 | Szabo et al. | 166/295 |
| 3,830,302 | 8/1974 | Dreher et al. | 166/294 |
| 4,064,940 | 12/1977 | Sparlin | 166/295 |
| 4,532,052 | 7/1985 | Weaver et al. | 307/222 |
| 4,773,481 | 9/1988 | Allison et al. | 166/270 |
| 4,776,398 | 10/1988 | Chu et al. | 166/403 |
| 4,871,021 | 10/1989 | Shu | 166/270 |
| 4,947,933 | 8/1990 | Jones et al. | 166/263 |
| 5,015,400 | 5/1991 | Shu | 507/211 |
| 5,061,387 | 10/1991 | Victorius | 507/219 |
| 5,203,834 | 4/1993 | Hutchins et al. | 166/270 |
| 5,358,051 | 10/1994 | Rodrigues | 166/295 |
| 5,486,312 | 1/1996 | Sandiford et al. | 516/102 |
| 5,944,106 | 8/1999 | Dalrymple et al. | 166/281 |

*Primary Examiner*—David Bagnell
*Assistant Examiner*—Jennifer Dougherty
*Attorney, Agent, or Firm*—Gordon G. Waggett; Robin C. Nava

[57] ABSTRACT

A wellbore service fluid comprising polymers having cross-linking groups capable of forming chemical bonds with other polymers without additional monomeric cross-linking agents is described, and related methods, particularly applicable to water control operations.

8 Claims, No Drawings

GELLING POLYMERS FOR WELLBORE SERVICE FLUIDS

The present invention relates to polymer based gelling composition for wellbore service fluids. More particularly it relates to polymer based gelling composition for reducing the flow of subterranean aqueous fluids into a well while maintaining the hydrocarbon production.

BACKGROUND OF THE INVENTION

Various types of wellbore fluids are used in operations related to the development, completion, and production of natural hydrocarbon reservoirs. The operations include fracturing subterranean formations, modifying the permeability of subterranean formations, or sand control. Other applications comprise the placement of a chemical plug to isolate zones or complement an isolating operations. The fluids employed by those operations are known as drilling fluids, completion fluids, work over fluids, packer fluids, fracturing fluids, conformance or permeability control fluids and the like.

Of particular interest with regard to the present inventions are fluids for water control applications, as during the life cycle of a hydrocarbon well, e.g., a well for extracting oil or natural gas from the Earth, the producing well commonly also yields water. In these instances, the amount of water produced from the well tends to increase over time with a concomitant reduction of hydrocarbon production. Frequently, the production of water becomes so profuse that remedial measures have to be taken to decrease the water/hydrocarbon production ratio. As a final consequence of the increasing water production, the well has to be abandoned.

In many cases, a principal component of wellbore service fluids are gelling compositions, usually based on cross-linkable polymers.

Polymer gels have been widely used for various wellbore service fluids, including fluids for conformance control of naturally fissured/fractured reservoirs. For an overview of existing polymer compositions, reference is made to the U.S. Pat. Nos. 5,486,312 and 5,203,834 which also list a number of patents and other sources related to gel-forming polymers.

Among the numerous cross-linking agents are inorganic ions (or ionic complexes) or polar organic molecules. When the polymer contains ionic groups such as carboxylate or sulphonate functions the polymer chains can be cross-linked by inorganic ions such as chromium(III) or zirconium(IV), frequently in the presence of monomeric ligands, such as acetate or adipate ions.

Furthermore, the gelation of high molecular weight polymers ($M_w > 10^6$ g/mol) has been extensively used in the development of water-based treatment fluids for water control is further described for example by R. D. Sydansk in "Acrylamide-polymer/chromium(III)-carboxylate gels for near wellbore matrix treatments", 7th SPE Symp. Enhanced Oil Recovery, Tulsa, Okla., April 1988, SPE/DoE 20214, or by R. S. Seright in: "Placement of gels to modify injection profiles", SPE/DoE Symp. Enhanced Oil Recovery, Tulsa, Okla., April 1994, SPE 27740. Typically for those methods, an aqueous solution of a high molecular weight polymer, such as a polyacrylamide/polyacrylate copolymer (a so-called partially-hydrolysed polyacrylamide), is gelled in situ in a porous formation using a metal cross-linker such as $Cr^{3+}$ or small water-soluble organic cross-linkers such as formaldehyde and formaldehyde/phenol. Other water-soluble polymers such as poly(vinyl alcohol), the polysaccharide guar gum and the copolymer poly(vinylpyrrolidone-co-2-acrylamido-2-methyl-1-propanesulphonic acid) which can be cross-linked with a variety of cross-linking agents such as $Zr^{4+}$ and boric acid. A more recent approach is described by A. Keller and K. A. Narh in: "The effect of counterions on the chain conformation of polyelectrolytes, as assessed by extensibility in elongational flow: the influence of multiple valency", J. Polym. Sci.: Part B: Polymer Phys., 32, 1697–1706 (1994). It includes the cross-linking of poly(sodium 4-styrenesulphonate) using $Al^{3+}$ ions to form a gel. The concentration of the high molecular weight hydrophilic polymers used to form hydrogels is typically in the range 3–10 g/l.

Copolymers containing polar and non-polar segments are described for example in U.S. Pat. No. 4,776,398. The copolymers are cross-linked in subterranean formations so as to control the permeability of the formation layer before injecting a driving fluid into injector wells.

The object of this present invention is therefore to provide novel polymers for wellbore service fluids. It is a specific object of the invention to introduce novel cross-linking methods for such polymers avoiding the use of environmentally potentially hazardous agents. It is a further specific object of the invention to provide polymer compositions for water control operations in hydrocarbon wells.

SUMMARY OF THE INVENTION

The objects of the invention are achieved by methods and compositions as set forth in the appended independent claims.

According to the invention there are provided a wellbore service fluid comprising polymers having cross-linking groups capable of forming chemical bonds with other polymers without additional monomeric cross-linking agents.

Chemical cross-linking is defined as forming a chemical bond between the cross-linked polymers. Chemical cross-linking is understood to be stable and thermally irreversible. Polymers as within the scope of the present invention are defined as molecules having a molecular mass of more than $10^3$, preferably more than $10^4$.

A preferred embodiment of the invention comprises a polymer which consists of one or more repeat units incorporating a small amount (less than 3%) of a cross-linking monomer. Preferred cross-linking monomers include phenolic residues and/or aldehyde or alcohol groups.

The fluid under acid or base conditions can self condense creating a cross-linked gel of comparable strength to the already existing cross-linked polymer systems. The resulting gel has the same uses (conformance control etc.) as conventional systems but without the added environmental and toxicological hazards of the monomeric cross-linkers.

In a further embodiment of the invention two or more different types of polymer are used in combination. The different polymers containing mutually compatible groups for cross-linking.

In a further embodiment of the invention, the cross-linking reaction is initiated by altering the pH-value of the fluid.

These and other features of the invention, preferred embodiments and variants thereof, and further advantages of the invention will become appreciated and understood by those skilled in the art from the examples following below.

MODE(S) FOR CARRYING OUT THE INVENTION

The invention can be exemplified in the case of a polymer containing an aldehyde (or alcohol) and a separate polymer containing a phenol used together to form a gel for use in conformance control.

The chemical reaction between aldehydes and phenols is a well documented process and is the basis for most organic cross-linking of polyacrylamide polymers to form gels. This reaction occurs under basic or acidic conditions and the gels formed are extremely strong and have many uses within the oil industry. The drawbacks to the use of these systems are that phenol is corrosive and causes burns and formaldehyde and other monomeric aldehydes are toxic or at the very least irritants. However, incorporation of these species onto the polymer chain eliminates their toxicity and greatly reduces their irritant properties, hence making for safer systems which are easier to handle.

A first example of a self cross-linking water-soluble polymer which consists of the monomer units acrylamide, acrolein and 4-vinylphenol according to the following structural formula

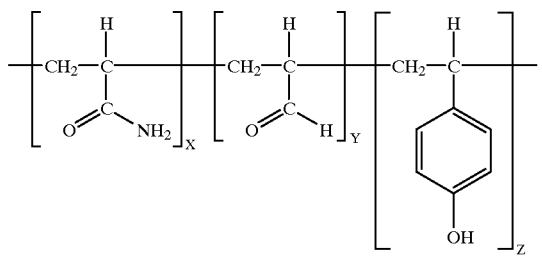

formed by the copolymerisation of the monomers acrylamide (mole fraction $X \leq 0.94$), acrolein (mole fraction $Y \leq 0.03$) and 4-vinylphenol (mole fraction $Z \leq 0.03$).

The condensation reaction between the phenol and the aldehyde still proceeds in a controlled manner to form the cross-linked gel and hence generate the desired water blocking system without the problems associated with the conventional systems which use separate (monomeric) cross-linking agents. An additional benefit of a self cross-linking polymer is that the cross-linking process is closely controlled and no screening out of the cross-linker or problems with mixing can occur.

The employment of two or more different polymer types containing different functionality allows for the gel time, gel strength and stability of the system to be controlled by varying the composition of the mixtures used as factors such as secondary cross-linking can be used advantageously.

The following example employs two polymeric systems. System A is a copolymer of acrylamide (mole fraction $X \leq 0.97$) and acrolein (mole fraction $Y \leq 0.03$) in accordance with the following structural formula

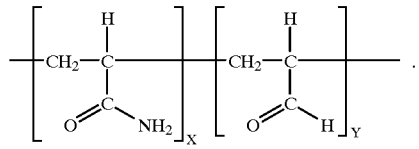

The second system (system B) is a copolymer of acrylamide (mole fraction $X \leq 0.97$) and 4-vinylphenol (mole fraction $Z \leq 0.03$) according to:

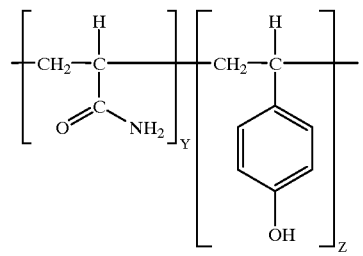

The use of system A alone will produce a gel suitable for lower temperature systems but the use of a mixture of the two polymers will result in a cross-linked gel of much higher stability for deployment in harsher climates.

What is claimed is:

1. A wellbore service fluid comprising polymers having a small amount of one or more repeat units incorporating a cross-linking group capable of forming chemical bonds with other polymers without additional monomeric cross-linking agents said fluid to be injected from surface location into a subterranean location and being capable of forming a gel at said subterranean location.

2. The fluid of claim 1, comprising polymers which consists of less than 3% of one or more repeat units incorporating a cross-linking group.

3. The fluid of claim 1, wherein the cross-linking group is selected from a group consisting of phenolic residues, aldehyde and alcohol groups.

4. The fluid of claim 1, comprising at least two different polymers capable of cross-linking with each other.

5. The fluid of claim 1, wherein in operation the polymers cross-link through a (poly)condensation.

6. The fluid of claim 1, wherein in operation the polymers cross-link through a reaction initiated by changing the pH value of the fluid.

7. A method of treating a subterranean formation penetrated by a wellbore, said method comprising the steps of preparing a wellbore service fluid comprising polymers having a small amount of one or more repeat units incorporating a cross-linking group capable of forming chemical bonds with other polymers without additional monomeric cross-linking agents; injecting said wellbore service fluid from surface location through said wellbore into a subterranean location; and letting said service fluid form a gel at said subterranean location.

8. The method of claim 3, further comprising the step of changing the pH value of the fluid to initiate a cross-linking of the polymers.

* * * * *